July 15, 1969　　　　　D. A. EPP　　　　　3,455,533
IRRIGATION PIPE GATE ARRANGEMENT
Filed Aug. 22, 1966
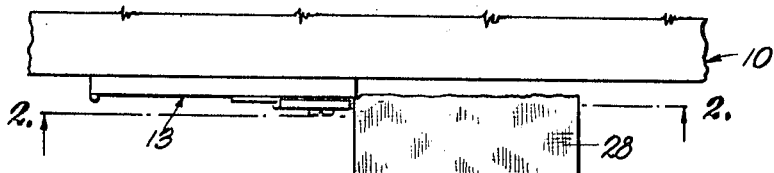
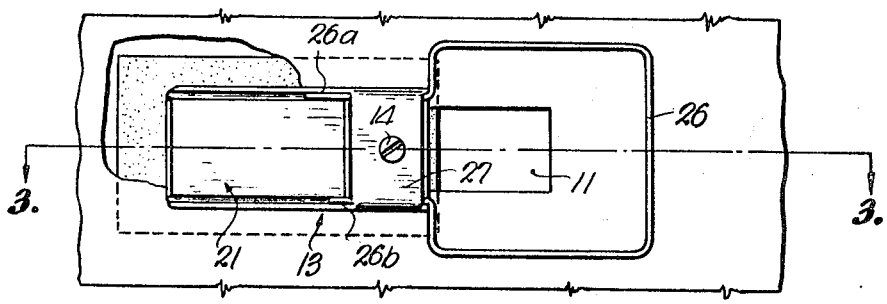
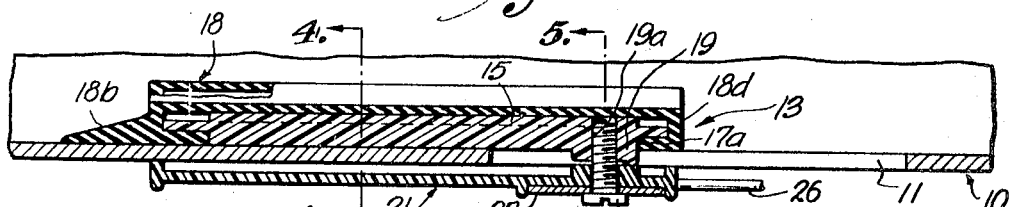
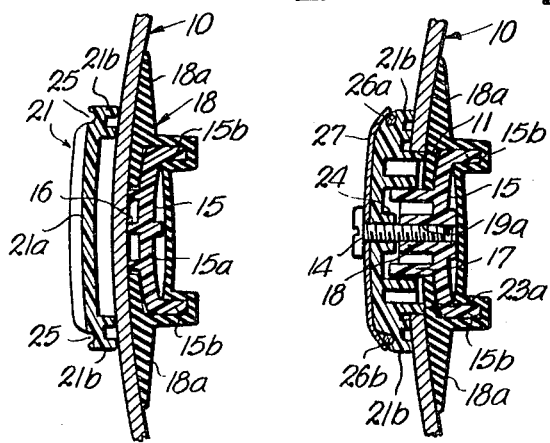
INVENTOR
David A. Epp
BY *Scofield, Kokjer, Scofield & Lowe*
ATTORNEYS

United States Patent Office 3,455,533
Patented July 15, 1969

3,455,533
IRRIGATION PIPE GATE ARRANGEMENT
David A. Epp, Henderson, Nebr., assignor to Henderson Manufacturing Co., Inc., a corporation of Nebraska
Filed Aug. 22, 1966, Ser. No. 574,207
Int. Cl. F16k 3/28
U.S. Cl. 251—145    4 Claims

ABSTRACT OF THE DISCLOSURE

A slidable closure gate for an axially oriented rectangular opening in the wall of irrigation pipe, the gate having a top slide with guide means registering with the side edges of the opening and a sealing boot carrier inside the pipe which is rigidly interlocked with and connected to the slide.

---

This invention relates generally to field irrigation equipment and deals more particularly with an improved sliding gate and pipe opening arrangement for irrigation pipe through which lateral flow from the pipe can be controlled.

In my prior patent, 2,918,251, I have disclosed a gate structure which is for the same general purpose as the subject of the present invention. Despite substantial commercial success, there still are limitations in the effectiveness of the patented gate, particularly with reference to operation in high pressure irrigation lines, to ease of incorporation into the pipe, to use with thin wall pipe and to the expense of preparing the pipe for reception of the gate. The primary object of the arrangement embodying the present invention is to provide a design for the pipe opening and associated sliding gate which overcomes the problems hereinbefore briefly noted.

The arrangement according to the present invention provides, as one of its most striking features, a sliding gate structure which is capable of successful operation not only in low pressure lines but also in high pressure lines. This feature is accomplished in large part by providing the pipe with a rectangular opening in the wall having its major axis parallel with the axis of the pipe and incorporating in the opening a sliding gate of unique construction which cooperates with the edges of the opening to provide not only a tight seal around the opening but also effective stabilization of the gate during movement thereof and at any position therefor.

Another important feature of the present invention resides in the ease of installation of the gate in the pipe, whether as original equipment or upon removal and replacement. Workers can readily assemble the gate with the pipe from the outside of the pipe, even wearing gloves, and more can be assembled with the pipe per man hour than has been possible in the past.

Still another feature of the invention is the provision of a sliding gate arrangement which eases greatly the task of pipe manufacturers in providing the openings in the pipe wall. In my present invention, and an earlier noted, the opening is rectangular in shape, which can more easily be formed by routing or punching then a keyhole opening or a round one.

Among other features of the invention are the provision of a gate which can be slid smoothly between open, closed or intermediate positions; which has a special nonclogging attachment means for a sock for conducting water away from the pipe; and which can be produced from highly resistant materials at low cost.

In the accompanying drawing, which forms a part of the specification and is to be read in conjunction therewith and in which like reference numerals indicate like parts in the various views;

FIG. 1 is a top plan view of a fragmentary portion of one side of an irrigation pipe fitted with a gate arrangement according to a preferred form of the present invention;

FIG. 2 is a view taken generally along the line 2—2 of FIG. 1 in the direction of the arrows, part of the pipe wall being broken away for purposes of illustration;

FIG. 3 is an enlarged sectional view taken generally along line 3—3 of FIG. 2 in the direction of the arrows;

FIG. 4 is an enlarged sectional view taken along line 4—4 of FIG. 3 in the direction of the arrows;

FIG. 5 is an enlarged sectional view taken along line 5—5 of FIG. 3 in the direction of the arrows;

FIG. 6 is a top plan view of the boot carrier for the slide gate, the carrier being disassociated from the other component parts;

FIG. 7 is a bottom plan view of same; and

FIG. 8 is a fragmentary perspective view showing the underside of the slide member at the leading end thereof.

Referring now to the drawings, reference numeral 10 indicates a portion of a cylindrical irrigation pipe, which is usually constructed of aluminum. Those skilled in the art will realize that the pipes are ordinarily of rather substantial diameter (6 to 12 inches) and that they are joined together by suitable couplings in end-to-end fashion.

Outlet openings are cut into the wall at a plurality of stations along the length of the pipe. In accordance with the present invention, the openings in the pipe, only one of which is shown at 11, are rectangular in form with the long axis of the rectangle parallel with the axis of the pipe. As will be seen, the length of the openings can be varied, depending on whether the pipe is to serve as a low pressure or high pressure pipe.

The slide gate of the present invention is denoted generally at 13. This gate comprises an assemblage of components which are joined together by a single screw or bolt 14, part of the components being located inside the pipe and others outside the pipe.

Located on the inside of the pipe and having a generally rectangular plan (see FIGS. 6 and 7) is a boot carrier member 15. As can be seen in FIGS. 4 and 5, the member 15 is generally U-shaped in cross section, having the central web 15a and the leg portions 15b. Preferably, the boot carrier 15 is formed of a strong corrosion resistant plastic, it most conveniently being molded by injection molding of Delrin. On its upper surface it is provided with three longitudinal ribs 16 which join the side wall of a rectangular rib arrangement 17 circumscribing a central boss 19 which is drilled and tapped at 19a to receive the connecting screw 14 earlier described. As can be seen from FIG. 5, the ribs which form the arrangement 17 are of substantially greater height than ribs 16.

The over-all length of the boot carrier member 17 is somewhat greater than the length of the longest opening with which the gate is to be combined. By way of example, I contemplate employing in low pressure pipe an opening 3½ inches in length and 1¼ inches in width. For high pressure pipe, the length of the opening will be reduced to 2 inches. Accordingly, I provide in such a situation an overall length for the boot carrier member of 3⅞ inches. The end wall 17a of the rectangular rib assembly 17 is spaced approximately 3/16 inch from the adjacent end of the carrier and the same spacing is employed between the ends of ribs 16 and the other end of the carrier.

Enveloped over and supported by the boot carrier member 15 is a boot 18 which has the same general configuration and construction as that set forth in my prior patent, 2,918,251. The basic differences between the boot disclosed in this application and in my prior patent is that in the present invention the side extensions 18a and 18b thereof are more finely tapered. The boot is constructed of a resiliently deformable material, preferably rubber.

The boot is provided with an internal cavity which is generally U-shaped in configuration to register with the shape of the boot carrier and has a central elongated opening 18c through which extend the ribs 16 and the rib assembly 17 earlier described. The boot is of substantially greater width than the breadth of the opening 11 and also of greater length than the length of the opening. The leading end 18d of the boot is substantially flat, being normal to the longitudinal axis of the boot.

The assemblage of boot carrier 15 and boot 18 is mounted on the inside of the pipe with the rib rectangle 17 positioned in the opening 11. Located on the exterior of the pipe and joined to the carrier by screw 14 is slide member 21.

Slide member 21 is generally rectangular in plan, having a breadth somewhat greater than the breadth of the opening 11 and a length somewhat greater than the maximum length of the opening. The slide member is preferably formed of a corrosion resistant plastic, for example, Delrin, and can conveniently be molded by the injection molding process. Basically, the slide member comprises a slightly arched central web portion 21a having at each side thereof inward projecting portions 21b providing footing surfaces confronting the pipe which are adapted to ride on the exterior of the pipe on either side of the opening. These portions 21b are of substantial thickness and are provided with lengthwise grooves 22 which provide closer accommodation of the footing surfaces to irregularities in the surface of the pipe.

Located adjacent the leading end of the slide 21 and adapted to interfit with the sides of rib assembly 17 are inward projections 23. The inside faces of projections 23 are adapted to overlap the outer sides of the rib assembly 17 and the projections and rib assembly operate to prevent twisting of the boot carrier member 15 and slide member 21 with respect to each other about the axis of screw 14. The outside surfaces of the projections 23, which are extended in depth somewhat by the projecting flanges 23a, are spaced inwardly from the inside faces of guide portions 21b and are adapted to engage with the opposite side edges of the pipe opening 11. In other words, the portions 23, and particularly the flanges 23a thereon, extend into the opening 11 with the outside surfaces of flanges 23a closely but slidably adjacent the side edges of the opening. The projections 23, 23a thus afford slide guide members which properly orient the gate with respect to the opening and provide guidance for the gate toward open and closed positions therefor.

It will be also noted that the extensions 23a on the members 23 are of sufficient depth to bear against the surface of the boot adjacent the opening 18d thereon, thus to firmly grip the boot between the top of the boot carrier and the extensions 23a.

Located between the members 23 on the center line of the slide member is a boss 24 which is apertured to receive the fastening screw 14.

On the outside of the slide and above the slide legs 21b are formed grooves 25 which run longitudinally of the slide. These grooves are adapted to receive the parallel legs of a sock attachment 26, the sock attachment being generally rectangular in form and of wire rod stock. The legs 26a, 26b of the sock attachment are fitted within the grooves. In order to retain the sock attachment in the grooves, a clip 27 is secured on the exterior of the slide by the head of the fastening screw 14, the clip having end portions which overlie and retain the rods within the grooves. The sock attachment provides a mounting for an irrigation sock 28 of conventional construction. It will be understood that the sock can be employed or not as may be desired.

In assembling the gate with a pipe, the components are disconnected so that the boot carrier and its boot are free of the slide. The assembly of boot carrier and boot is inserted through the opening 11 and positioned so that it is aligned in the opening with the rib assembly 17 visible within the opening. While holding the boot assembly within the pipe the slide is placed in position with the screw opening in the slide aligned with the screw opening 19 in the boot carrier. In this condition, the projections 23, 23a should be centered within the opening. If the sock attachment is to be employed, the clip 27 is placed in position on the outside of the slide and the screw is inserted and screwed down loosely. The screw should not be tightened until the sock attachment legs 26a, 26b are placed under the clip. Further tightening of the screw will result in final assembly.

If the sock attachment is not used, the clip can be eliminated and the screw tightened down on the slide itself.

As clamping pressure is applied, the surface of the boot 18 is drawn into conformity with the curvature of the pipe. The edges of the projections 23a are drawn tightly down on top of the boot as are the pipe engaging ends of the slide legs 21b.

In order to control the size of opening 11 which is available for water flow, the slide is moved parallel with the axis of the pipe. To close the opening, the slide is moved to the right (as viewed in FIGS. 2 and 3), which is limited by engagement of the end wall of rib assembly 17 with the end edge of the pipe opening. In this condition, the boot is engaged all around the periphery of opening 11 and prevents any leakage of water. Obviously, shifting of the gate to the right will progressively expose the opening 11 and the gate can be set at any position desired from full open to full closed.

The gate is readily interchangeable between high and low pressure pipe, being capable of assemblage with both long and short openings. It is easy to assemble with the pipe, and, if necessary, to remove for replacement of a boot.

From the foregoing, it will be seen that this invention is one well adapted to attain all of the ends and objects hereinabove set forth together with other advantages which are obvious and which are inherent to the structure.

Having thus described my invention, I claim:

1. A sliding gate structure for use in a rectangular opening in the wall of an irrigation pipe, said gate comprising:
   a closure member for said opening positioned on the inside of said pipe adjacent said opening and displaceable parallel with the axis of the pipe between open and closed positions for said opening,
   a slide member positioned on the exterior of the pipe and overlying said opening, said slide member having formed thereon on the pipe confronting side a pair of longitudinally extending slide guide members which extend into said opening adjacent the side edges thereof and cooperate with said side edges to confine motion of said slide member to a linear path parallel with the pipe axis,
   a detachable screw connecting said closure member and slide member together for movement as a unit, said screw extending from the outside of said slide member inwardly through said opening and into said closure member, and
   integral cooperating means on said slide member and closure member respectively operable to prevent rotation of said closure with respect to the axis of said screw.

2. A gate structure as in claim 1,
   said closure comprising a flexible boot and a carrier for said boot, said boot having portions adjacent and exposed in said opening, and
   projections on said slide member operable to engage and clamp said boot portions tightly between said projections and carrier.

3. A gate structure as in claim 1,
   said integral cooperating means including a cavity in the face of one said member confronting said opening, and elements on the other said member projecting through said opening and into said cavity.

4. A gate structure as in claim 1,
said slide member having parallel recesses on the outer face thereof,
a sock attachment having leg portions positioned in said recesses, and
clip means secured to said slide member by said detachable screen and having portions overlying and restraining said leg portions in said recesses.

References Cited

UNITED STATES PATENTS

| | | | |
|---|---|---|---|
| 2,918,251 | 12/1959 | Epp | 251—145 |
| 3,327,990 | 6/1967 | Hohnstein | 251—145 |
| 2,932,484 | 4/1960 | Stearns | 251—145 |

M. CARY NELSON, Primary Examiner

W. R. CLINE, Assistant Examiner